July 19, 1949.  W. W. ROWE  2,476,325
METHOD OF MAKING WATERPROOF AND
MOISTURE-VAPOR PROOF PACKAGES Filed April 23, 1943   3 Sheets-Sheet 1

WILLIAM WALLACE ROWE
INVENTOR.

BY Allen & Allen
ATTYS.

July 19, 1949. W. W. ROWE 2,476,325
METHOD OF MAKING WATERPROOF AND
MOISTURE-VAPOR PROOF PACKAGES
Filed April 23, 1943 3 Sheets-Sheet 2
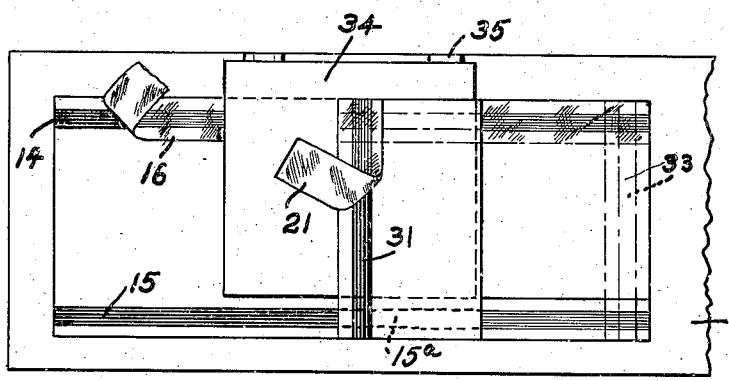
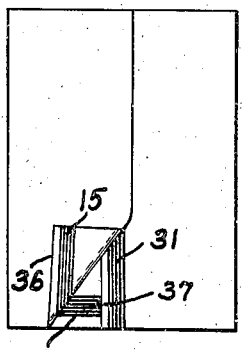
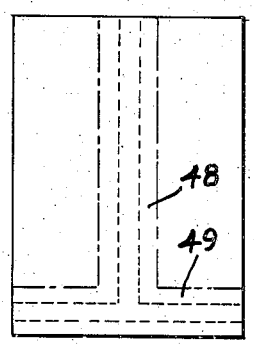
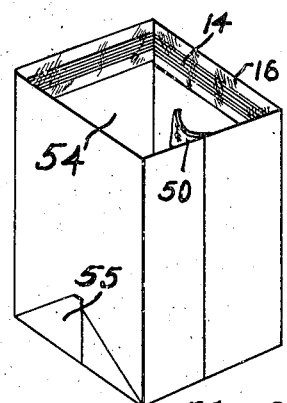
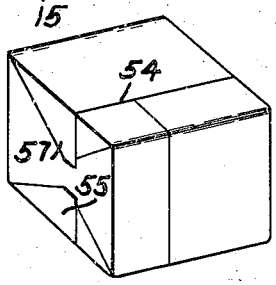
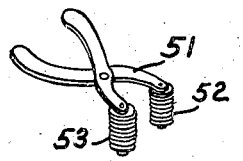
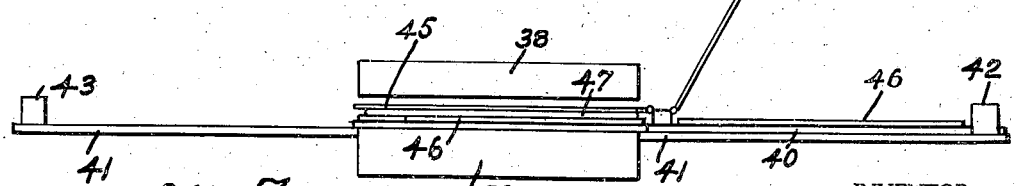
INVENTOR.
WILLIAM WALLACE ROWE
BY Allen & Allen
ATTYS.

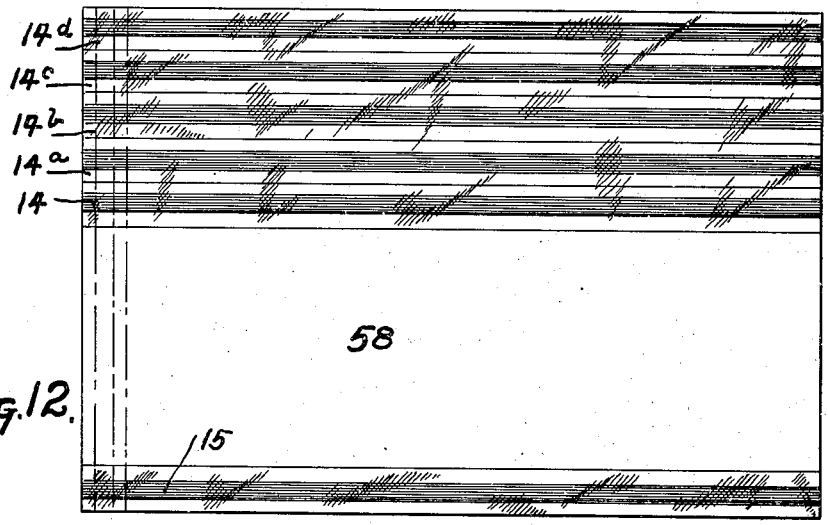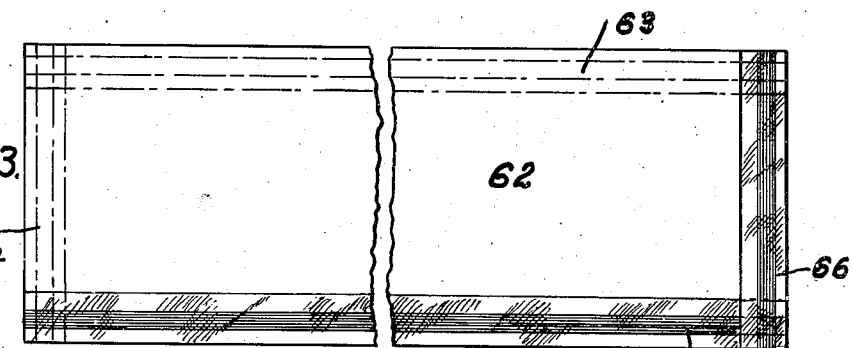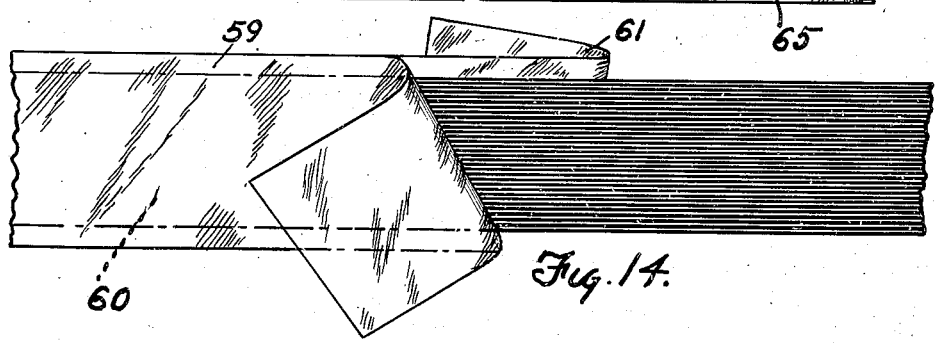

Patented July 19, 1949

2,476,325

UNITED STATES PATENT OFFICE 2,476,325

METHOD OF MAKING WATERPROOF AND MOISTURE-VAPORPROOF PACKAGES

William Wallace Rowe, Cincinnati, Ohio, assignor to Cincinnati Industries, Inc., Lockland, Ohio, a corporation of Ohio Application April 23, 1943, Serial No. 484,223

10 Claims. (Cl. 93—35)

My invention deals in principal part with the provision of packages which will protect their contents from water upon submersion, even to very considerable pressures. In the testing of packages of this type, it is not unusual first to submit the package to a severe handling test and thereafter submit it and its contents to submersion in water. For some purposes tests are made at pressures approximating a thirty-foot head of water. The packages are required to protect their contents against water submersion for long periods of time, sometimes as much as ninety days. The packages themselves may be employed for foods, stores, cigarettes, ammunition and the like. My invention also deals with the provision of packages possessing an exceptionally high degree of resistance to the passage of moisture-vapor through the body material, seams and closure.

The complete packages may have various shapes and sizes and various constructions; but an essential feature of them is a waterproof and moisture-vapor proof bag, completely sealed and serving as a protective membrane. This bag may be located in a box, or outside of a box, or within one box and outside of another. This application concerns itself with the provision of the moistureproof or waterproof bag, and analogous structures.

The problem is not alone that of providing a suitable web material for the bag which will be satisfactorily strong and water resistant. This must be done; but there lies beyond it the problem of making the bag itself with complete waterproofness as to those seams produced during the manufacture of the bag, and the provision of a mode of obtaining waterproofness in a closure seam which must, of course, be formed after the bag is filled with its contents. There are also problems connected with the economical fabrication of the bag itself, with the handling of sheet material having areas prepared for seam formation, with the provision of a bag or other structure with seam areas prepared for closure, with the economical closure of the bag without the use of separate adhesive or elaborate tools, and with the placement of areas of the material prepared for seam formation both in the manufacture of the bags and in the sealing thereof.

The fundamental objects of my invention relate to the provision of solutions for these problems. It is an object of my invention to provide a structure for the purpose described which is non-critical both in manufacture and in sealing.

These and other objects of my invention, which will be set forth hereinafter or will be apparent to one skilled in the art upon reading these specifications, I accomplish by that certain construction and arrangement of parts and in that procedure of which I shall now describe an exemplary embodiment. Reference may be made to the drawings forming a part hereof, and in which:

Figure 5 is a plan view of diagrammatic character showing a mode of operation in forming a bag from the prepared blank.

Figure 6 is a plan view of a bag illustrating the manner in which the areas of seam-forming adhesive coact in the finished structure.

Figure 7 is a view of diagrammatic character of a pressing operation.

Figure 8 is a plan view of a bag in which preferred areas of pressure application in pressing are indicated.

Figure 9 is a perspective view of a bag in erected form, ready to receive its contents.

Figure 10 is a perspective view of a filled and closed bag.

Figure 11 is a perspective view of one type of closing tool which may be employed.

Figure 12 is a plan view of a blank to form a bag which may be opened and resealed a number of times.

Figure 13 is a plan view of a blank prepared in such manner that when a structure is made from it, adhesive will come against adhesive in all seams.

Figure 14 is a view of a structure useful for forming seams in unprepared areas, as will hereinafter be set forth.

Figure 1:
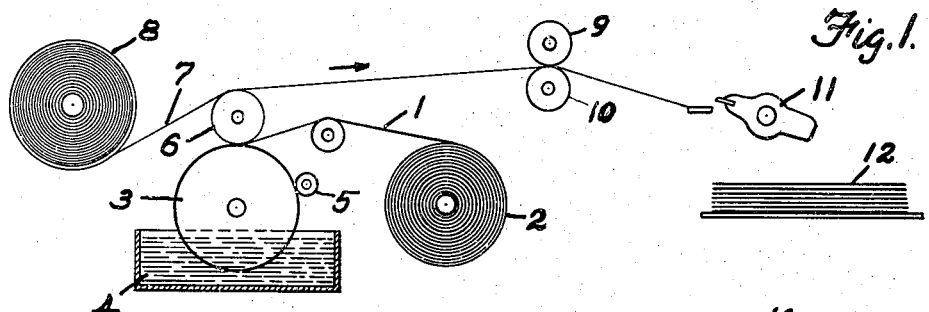
Figure 1 is a diagrammatic plan view of a machine and operation for the forming of bag blanks having two longitudinal areas prepared for seam formation.

In the practice of my invention, I prefer to employ a fabric which is formed of paper creped with crossing sets of creping crinkles after the manner set forth in Patents 2,008,181 and 2,008,182 to William C. Kemp. When the paper is creped by means of the positive adhesive action of a suitable binder such as bitumen or some other thermoplastic or adhesive substance, the crinkles which are formed are exceedingly fine and velvety in character. The Kemp process results in a continuous web characterized by crossing sets of creping crinkles, both sets being disposed at a substantial angle to the major axis of the web. Such webs are universally stretchable, and so are combined fabrics made by plying such webs to each other or to webs of stretchable creped cloth or the like. I am not limited to paper for the webs themselves; and I may employ either alone or in combination with paper, webs of other character such as amorphous films, foils or the like. Cloth may likewise be employed but is advantageous primarily in connection with webs of paper or other materials not characterized by an open construction.

As to the creping and plying adhesives, there are many which are available; but it should be remembered that in the final product it is preferable that the adhesive be not one which is hard and brittle, but on the contrary, one which remains pliable at least at ordinary temperatures. Besides bitumens and various solid waxes and the like, certain resinous substances of synthetic character may be employed as well as certain kinds of waxes, rubber derived from latex or other natural or artificial dispersions, and the like. Since the ultimate fabric is a plied structure, it is desirable that the fibrous plies be themselves waterproofed to the extent at least of preventing the passage of water or moisture-vapor through the fabric in its plane beneath areas of seam formation. The layers of adhesive by which the plies are held together are themselves waterproof membranes; but it is desirable that water be prevented from seeping into the plies themselves at the edges thereof and weakening them; and to this end I prefer to treat the whole face of each of my fabric plies with a suitable antiwicking substance. Such a substance may be a bitumen, or one of the waxes, natural or artificial resins, compositions of rubber and resin, and the like. Such compositions not only proof and protect the fabric, but tend also to unify it and increase its strength and resistance to splitting in its plane.

In the formation of my bag, I first impose parallel lines of seam-forming adhesive on the continuous web and then cut it apart into bag blanks under such conditions that blanks are formed of bag dimension in width and slightly more than twice bag dimension in length, each blank now having on one side stripes of adhesive running parallel to and lying close to the longer edges of the blanks. With most suitable adhesives it is necessary that these lines of adhesive be protected with a cover strip for a purpose hereinafter set forth.

These operations may be accomplished on a machine such as that shown in Figure 1. Here I have shown the web 1 of composite material being unwound from a roll 2. As the web 1 moves along, stripes of a seam-forming adhesive are printed on it by means of a series of discs 3, which turn in a pan 4 of the adhesive. A doctor roll 5 will limit the quantity of adhesive applied by the discs. As the stripes of adhesive are printed on the web 1, it may be supported by a roll or the like 6. A cover strip 7 of cellophane or other suitable substance is withdrawn from a roll 8 and led onto each of the printed stripes of adhesive. The treated web passes through pinch rolls 9 and 10, and thence to a fly knife or the like 11, which cuts the web into desired lengths, shown at 12.

My invention contemplates considerable variation in the nature of the adhesive. Bitumens, waxes, resins, compositions of rubber and resin and various synthetic or natural substances may all be obtained or made to have the desired qualities. Thus, the substance of the binder is not as important as the qualities which it should possess. I have found most advantageous a type of seam-forming adhesive which is tacky at ordinary temperatures, at least in the sense of being pressure sensitive, and which, if any heat is required to bring it to a strongly adhesive condition, requires very little heat. A bitumen such as asphalt may be blended, blown or cut to give it not only a relatively slight tack at ordinary temperatures, but also strong cohesiveness in its body as well as the quality of continuous non-brittleness throughout the ranges of temperatures encountered in the use of my bags. Strong cohesiveness is the necessary feature because the seam-forming adhesive is preferably applied in considerable thickness. When forming a bag by lapping the ends of a single sheet to form a center seam which is crossed at right angles at the ends of the bag by transverse closure seams, there is a problem connected with the sealing of what might otherwise be a pin hole or perforation through the end closure seams at the offset, due to the lapped edge of the fabric. It is desirable to apply the adhesive in sufficient thickness, and to choose an adhesive of such actual or potential plasticity, that at the time of sealing it will flow sufficiently to fill this offset and seal the bag. I shall hereinafter confine my description to an asphaltic adhesive; but it will be understood that my invention contemplates the use of adhesives of other characters. Adhesives, such as those containing rubber derived from latex, and which are relatively strongly adhesive to themselves and relatively non-adhesive to other substances, may be employed with some variation of the manner of their application particularly as to their application to both faces of the fabric at the center seam strip hereinafter to be described. An advantage, however, of an adhesive having the qualities hereinabove first set forth, is that it need not be precoated on both of the surfaces which are brought together to form the seam.

For asphaltic adhesives or adhesives of similar character, I have found cellophane or the like to be the most satisfactory and cheapest kind of covering strip which I may employ. With bituminous adhesives of considerable tack and strong cohesiveness, the characteristic of cellophane is that if an attempt is made to peel it slowly from the stripe of adhesive, the adhesive tends to divide in its body, and there is considerable danger of tearing the strip. But if the strip is removed by a sudden pulling motion, it comes away readily and cleanly from the adhesive surface and without danger of tearing. With non-moistureproof cellophane an inherent characteristic is that if it is moistened on its free surface it will peel cleanly from the adhesive stripe. I am not limited to the use of cellophane as a covering and protective strip, but may employ any suitable material, being governed by dictates of economy and ready removal.

Figure 2:
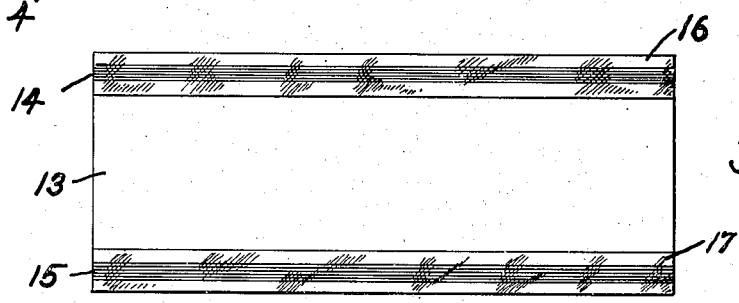
Figure 2 is a plan view of the bag blank so formed.

As shown in Figure 2, the bag blank in its usual form is now a rectangular sheet of fabric 13 having adjacent its longer edges stripes 14 and 15 of seam forming adhesive. These stripes should be located close to the longer edges, but need not come down exactly to the edges. Each stripe will be covered by a strip of cellophane or the like 16 or 17. In the mode of manufacture illustrated in Figure 1, these cover strips will not extend beyond the ends of the blank and need not extend beyond the side edges thereof. However, the strips 16, 17 will be wider than the stripes of adhesive so that the strips may be grasped by the fingers for their removal.

Figure 3:
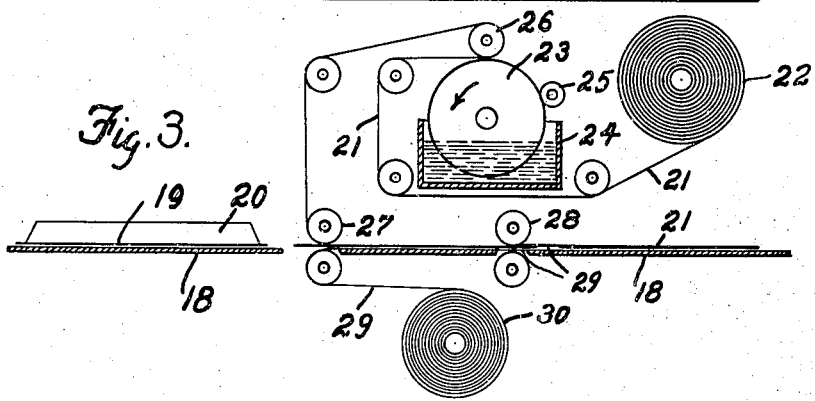
Figure 3 is a diagrammatic view of a machine and method for forming a transverse seam area on the opposite side of the bag blank.

As shown in Figure 3, on a table or work surface 18, the bag blanks diagrammatically illustrated at 19 are now passed with that side uppermost which has not hitherto received stripes of adhesive. Operators line up the bag blanks against a guide 20 with their shorter edge against the guide, and move them forward along the table. A strip of cellophane 21 (or other covering substance as set forth above) is shown as withdrawn from a roll 22 above the table and carried over a stripe coating disc 23 turning in a pan of adhesive 24 and provided with a doctor 25. A roll 26 presses the strip 21 against the disc.

As the bag blanks move along, the cellophane bearing the stripe of adhesive is pressed against each bag by rolls 27 and 28. The adhesive, at the time of its application to the bags by means of the strip, must of course be of such consistency as to adhere strongly to the bag blanks, and this may require temperature control. Because it is usually impossible to butt the bag blanks together as they pass along the work table 18, I have found it advantageous to lead beneath the blanks a strip of paper or the like 29, from a roll 30. In the spaces between the bag blanks as they move along, the strip 21 bearing the stripe of adhesive will be applied to the paper strip 29, but since the bag blanks move along above the paper strip, the adhesive and cover strip 21 will be applied to them when they are in a position to receive it. Operators along the table cut the bag blanks from each other by severing the strip of paper 29 and the strip of cellophane 21 adjacent each bag blank. The result of the procedure shown in Figure 3 is the provision of a bag blank 13 in the condition shown in Figure 4. This figure shows the opposite side of the strip from that shown in Figure 2, and it will be noted that across one end thereof there is a stripe 31 of seam-forming adhesive covered by a cover strip 21.

In Figure 5 I have illustrated diagrammatically further steps in the formation of my bag. On a work table 32 there is shown a stack of the blanks 33 with that face up which is shown in Figure 2. A flat forming template 34, which for convenience may be hinged as at 35 to the edge of the table, is brought over the blank or stack of blanks. The operator next removes the strip of cellophane 17 from the strip of adhesive 15, along one of the longer edges of the blank. Then one end of the blank (that end which bears the transverse strip 31) is folded over the template 34. The length of the template is such that it does not come out to the edge of the blank, and the folding operation thus described results in causing a portion of the adhesive stripe 15 to adhere to itself, forming part of a bottom seam in the bag as at 15a. Next the operator removes the cellophane strip 21 from the seam-forming stripe 31. It will be evident that when the remaining end of the bag blank is folded over the template the bottom seam will be completed. But this folding over, if nothing else were done, would result in the interposing of an end portion of the cellophane strip 16 between the adhesive stripe 31 and the adhesive stripe 14 at the top of the bag. Consequently, before making the final bag fold, the operator rips back the cellophane strip 16 a slight amount, leaving the free end thereof inside the bag or projecting slightly from the mouth thereof. In essence, the folding is done so that the first folded over portion is interleaved, as it were, between the second folded portion and the end of the cover strip 16.

The bag is now completely folded, and is in essence a bag having a center lapped seam and a continuous bottom seam in which the parts are in face to face relationship. The top of the bag has been prepared for seam formation, but the stripe of seam forming adhesive 14 is still covered with the cellophane cover strip 16. It will remain so during the shipment of the bag to the manufacturer who is to fill it with his product; and the cover strip will remain in place during the filling and until the final sealing of the bag.

As shown in Figure 6, where a portion of the blank at the bottom seam of the bag has been turned back to illustrate the construction, the bottom seam is formed by the stripe of adhesive 15. The stripe of adhesive 31 forms the longitudinal center seam, but it will be noted that the stripe of adhesive 15 extends out to the edge of the turned back portion 36; and when this portion is turned down into final position, it will overlie a portion of that edge of the fabric upon which the stripe 31 is positioned. Hence, it will close and seal what might otherwise be a channel for the passage of water between the plies at the position 37 illustrated in the figure. This will explain why the position of the adhesive strip 31 is also non-critical in my bag, so long as it lies in a position to be lapped by the opposite edge of the fabric. It will preferably lie close to its edge of the fabric; but it is not necessary to attempt so to apply it that it will come out to the actual edge of the fabric. The channel between fabric plies will be closed by the adhesive stripe 15, as hereinabove explained; and a similar action will have occurred at the top of the bag by reason of the peeling back of the cover strip 16, as already outlined. There will be a sufficient thickness of adhesive in the combined layers 15 to close the point of weakness at the offset indicated.

Since the folding operations just described and illustrated in Figure 5 are in practice usually formed by hand, and since no pressure is applied to the seams other than a smoothing pressure exerted by the hands of the operator, I prefer now to press my bags over the area of seam formation therein. This may conveniently be done in an apparatus illustrated in Figure 7. A press is provided having platens 38 and 39. Suitable movement means are provided for the platens. A member 40, somewhat more than twice as long as one dimension of the platens, is provided, and is slidable on a work table 41 coplanar with the top of the lower platen 39. Stops 42 and 43 are provided on the table 41, so that the member 40 can be moved to alternate positions in which first one half of it and then the other are located between the platens. I prefer to hinge members 44 and 45 to the part 40. The member 40 is preferably provided with configurated pressing parts, indicated at 46 to confine the pressure to desired areas. In the position shown, one bag 47 is being pressed between the platens, while an operator has raised the member 44 on its hinges and will position a bag on the other end of the member 40. When the platens are separated, the member 40 will be slid to the left in Figure 7, the member 45 will be raised, the pressed bag removed, another inserted in its place, and the cycle of operations repeated.

Figure 8 is a plan view of a completed bag in which the areas of pressure have been indicated at 48 and 49; and it will be noted that it is preferably substantially confined to the areas of seam formation. It is not desired to press the bag elsewhere, and particularly at the folded edges thereof. In shipping my bags, indeed, I preferably package them in such a way that baling or band pressure will not be exerted on the folded edges thereof.

While I have described one pressing means and method, it will be understood that it is exemplary merely. The seams could, indeed, be pressed by hand. In any reciprocating press, a fixed matrix may be provided to confine the pressure to the seam areas, and the bags can simply be inserted and withdrawn from the press individually. A piece of heavy canvas or the like overlying the bag on the matrix is useful to prevent side spread under pressure, and this could be in the form of an endless band advanced slightly for each press impression.

The center seam of the bags can be pressed with a continuous rolling motion. For example, I may provide a continuous heavy canvas belt, upon which the bags are laid one by one with their center seams extending lengthwise of the belt. As the belt carries the bags forward, they pass under a series of infra-red lamps which warm up the seam areas of the bags. The belt then passes around a cylinder of large diameter (which may likewise be warmed if desired), so that the bags are confined between the canvas belt and the cylinder. Rolling pressure is then applied against the canvas belt by external means in the form of rolling discs or the like. The bottom seams may be otherwise pressed, or pressed in similar apparatus.

The operation of pressing has a number of functions. In the bag structure illustrated in Figure 6, it will be noted that there are three thicknesses of the body fabric over the area of the longitudinal center seam. This tends to relieve the pressure on the bottom seam immediately adjacent this area on both sides. Also, it will be noted that, as at 37 in Figure 6, an offset is formed by the edge of the body fabric within the area of the bottom seam. The pressing tends to cause the adhesive to flow not only to fill an offset as at 37, but to equalize pressure elsewhere. Moreover, when made of the preferred materials, as hereinabove set forth, my fabrics are themselves compressive and this assists in minimizing offsets and equalizing pressures.

Some degree of embossing is frequently useful in connection with pressure. Deep embossings are not desirable, and frequently the roughness of a piece of canvas or other coarse, woven cloth is sufficient for my purpose. For the equalization of pressures where a matrix is used, as at 46 in Figure 7, I prefer to make the raised portions of rubber or other resilient material. The covers 44 and 45 of Figure 7 and the canvas or canvas belts which I have mentioned elsewhere are useful in minimizing spread of my fabrics under pressure.

By the exemplary means and procedure which have now been outlined, finished bags are produced, and may be shipped to the point at which they will be filled and the finished packages made. I have already indicated that so far as the use of my bags as the water-resistant membrane in a submersible package is concerned, the nature and construction of the package can be widely varied. Unless the contents themselves are of incompressible character, it will be usual to include in the package, and usually within the membrane, some structure to resist the compressive forces of submersion under considerable heads of water. In some instances the contents may be placed directly in my bag and the bag then placed in an outer bag, carton, box or case. In other instances, the contents will first be placed in a box or case, and this in turn placed in my bag. An additional protective box or case may be placed over this combined construction.

In any event, the flat bag illustrated in Figure 8 is squared up as indicated in Figure 9. This is usually accomplished either over a fixed mandrel or a mandrel made up of movable alligator jaws; and the body of the bag is erected to square or rectangular shape, depending upon its dimensions, in such a manner that the bottom seam can be folded against the bottom of the bag, and in such manner that ears are formed which can be folded over against side portions of the bag, as illustrated at 55 in Figure 9. It will be noted that the bag is now in erected form, and that it has an open mouth as at 54. Inside the mouth appears the line of seam-forming adhesive 14 covered by the cover strip 16, and an end portion of the cover strip is free, as at 50, by reason of the interleaving action described in connection with Figure 5.

The cover strip protects the line of adhesive 14 during the introduction of the contents into the bag. After the contents have been introduced, the cover strip 16 is removed from the mouth of the bag. The mouth then is spread or fish-tailed in such manner as to form a closure in which portions of the adhesive line 14 adhere to each other. The closure, when formed, will be the same in character and conformation as the closure at the bottom of the bag hereinabove described.

After the positioning of the seam parts it will be usual to press the seam together for the same purposes as dictated the pressure operation on the bag during manufacture, as hereinabove described. A pressing means is desirable as an adjunct to this operation, and it may involve pressing elements on a machine through which the filled bags are passed. The pressure elements may have means for the application of heat. Or a hand tool may be employed for the purpose. In Figure 11 I have indicated such a tool as comprising a bifurcated and pivoted body portion 51, built in the fashion of tongs or pliers, with a smaller roller 52 or 53 on each of the jaws of the device. These rollers are preferably grooved or otherwise configured in a mating fashion for embossing, as is indicated in the drawing. They may, if desired, be provided with electrical heating means, but this is not in most instances necessary. The handles of the device are long enough to enable the rollers to be brought together under considerable force at one position along the top seam of the bag; and the tool is thereafter moved to cause the rollers to transverse the top seam, exerting pressure and preferably an embossing action throughout the seam length.

Figure 4:
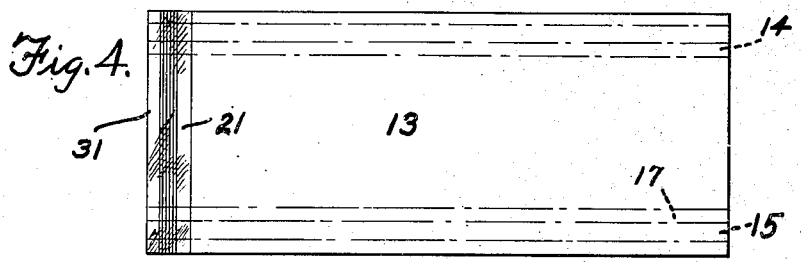
Figure 4 is a plan view of the blank as so treated.

When the top seam has been completed, the top portions of the bag will then be folded as previously described for the bottom, resulting in a top seam lying over the top of the bag as at 56, and ears which are bent over against portions of the bag as at 57, in Figure 10. The sealed structure illustrated in this figure may then, as desired, be included in any box, case or enclosing structure which is to be employed. In some instances, and especially for the relatively smaller and lighter packages, my bag may form the outer covering. Where the size and weight of the package is such that normal handling is likely to result in heavy snagging or tearing action on the package itself, the use of an outer case, carton or structure is indicated.

Where the bag is to contain an interior carton, unitary article or unitary assembly of articles, the bag itself may be formed up from the blank illustrated in Figure 4 directly around the carton or assembly by a procedure based upon the description which has gone before. The carton or assembly is essentially substituted for the template 34 in the procedure illustrated in Figure 5, and the center seam is formed essentially as before. Because it will not be possible to practice the pressing procedure illustrated in Figures 7 and 8, it will be found necessary to press the center seam in place. Where the carton or assembly furnishes in itself sufficient resistance, a portion of the center seam may be pressed thereon, as by a warm iron in the hands of the operator; and for pressing outlying portions of the center or axial seam which lie beyond the ends of the carton or assembly, movable supports may be brought into position within the tube to form continuations of the upper surface of the carton or assembly for pressing purposes. Where this is not feasible, a support in the form of a thin or blade-like ironing board may first be placed over the carton or assembly, and the bag tube formed over it, and pressed on it. Thereafter the board will be withdrawn.

The procedure thus described results in the formation of a tube without either end closure. In forming the tube, the strips 16 and 17 will be torn back slightly for purposes hereinabove set forth. After the formation of the tube, both end closures may be formed as described in connection with Figures 10 and 11 hereinabove.

In many classes of packages, moisture or vapor proofness is a quality desired, and frequently contents are packed with a desiccation agent, such as silica-gel. It is a requirement for some of these packages that they shall be openable and resealable to permit the removal of the desiccant. As shown in Figure 12, this may be accomplished by using a blank 58 which is substantially wider than the minimum desired bag length, and on one side of this blank applying the line of adhesive 15 along one edge and a plurality of parallel lines of adhesive, 14, 14a, 14b, 14c and 14d adjacent the other blank edge, each of these strips having its own covering strip. When the package is first sealed, this is preferably done using the adhesive stripe 14d. Thereafter, to open the bag, the portion containing the seam formed by this stripe may be merely cut off, and after such operations as are desired upon the contents of the bag, it may be resealed using the adhesive stripe 14c. A repetition of these operations is possible as many times as the number of stripes 14–14d permits.

While I have described an exemplary arrangement of stripes of adhesive applied to a bag blank, it will be understood that other stripe arrangements are within the scope of my invention. By way of example, when it is desired to form the center longitudinal seam of the bag by bringing together stripes of adhesive upon each of the lapped walls, it is possible to apply an additional transverse stripe of adhesive paralleling the stripe 31 in Figure 4 but adjacent the opposite edge of the blank and on the opposite side of the blank. For special purposes, still other arrangements are possible. While I have described a one-piece bag, my invention contemplates that the circumference of the bag may be made up from two or more pieces. I may, by way of example, provide one sheet with two longitudinal adhesive stripes upon one side, as shown in Figure 2, and two transverse stripes of adhesive on the other side. This may be joined with a second sheet having two longitudinal and two transverse stripes on the same side of the sheet. This is assuming that it is desired to bring adhesive against adhesive in all seam-forming portions. Where this is not desired, of course, the number of adhesive stripes may be cut down. In a structure in which several lapped joints are to be made circumferentially and all in the same direction, sheets may be employed each having two longitudinal stripes and one lateral stripe on one side and a second lateral stripe on the other side.

It will also be understood that my invention is not limited to the packaging of materials in preformed bags, but is applicable to a wide variety of problems connected with the covering and protecting of various objects. In the covering and protecting of large pieces of machinery, sheets may be joined together, as will be clear from the description hereinabove, to form a large tarpaulin-like covering, which then may be wrapped around the article to be packaged with the formation of closure and sealing seams in ways heretofore made clear. It will be realized that there will be instances where preformed sheets cut to regular or irregular shapes and preprepared for seam formation cannot be used without considerable wastage of material. In other words, there are packaging problems in which it is advantageous to be able to trim the fabric to meet particular needs and then form face-to-face or lapped seams in areas not theretofore prepared for seam formation. I have found that the problems involved can be solved by providing stripes of asphalt or other adhesive which may be applied at the time of the sealing of the package. A structure for this purpose is illustrated in Figure 14 where, to a strip of cellophane 59 I have applied a coating or stripe of adhesive 60 by printing means analogous to those described in connection with Figures 1 and 3. The opposite side of the stripe 60 is then covered with another strip of cellophane 61, and the material may be rolled or otherwise packaged for shipment. When it is desired to use the adhesive stripe 60, its coverings 59 and 61 may be removed and the stripe of cohesive material may be bodily handled. Where the covering strips are of non-moisture-proof cellophane, moistening them will permit their ready removal from the adhesive stripe. The stripe itself may be laid between two mating surfaces of fabric and the seam sealed by pressure and heat, as will be understood. Again, it is possible to remove but one of the strips 59 or 61, and apply the adhesive stripe to a fabric while still borne by the other strip. It may be caused to adhere by heat and pressure. The remaining strip may then be removed after the stripe has cooled, and a seam formed as above described.

The teachings of this application are useful in roofing and similar arts where large surfaces are to be covered with fabric. Long rolls of material may be made up with areas prepared for seam formation. Since in roofing it is generally desired that the laps be all in one direction, lengths of roofing fabric may be prepared as illustrated in Figure 13 at 62, and having upon one side a longitudinal stripe of adhesive 63 and a transverse stripe of adhesive 64. On the other side it will have a longitudinal strip of adhesive 65 and a transverse strip of adhesive 66. Where it is not desired to bring adhesive against adhesive in all seam areas, simpler structures may be provided as will be evident. Where the material must be cut, as at an eave, it may be cemented to other pieces of fabric, or even to an underlying roof deck through the use of the structure shown in Figure 14.

Modifications in my invention may be made without departing from the spirit of it, as will be evident. Having described my invention in an exemplary embodiment, what I claim as new and desire to secure by Letters Patent, is:

1. A process of producing bags which comprises forming bag blanks of suitable fabric, said blanks having a width equal to the desired length of the bag, and a length somewhat greater than twice the desired width of the bag, said blank bearing on one face parallel lines of thermoplastic adhesive, pressure sensitive at normal temperatures, adjacent each of the longer edges thereof and extending substantially across said face, said lines of adhesive being protected by covering strips, said blank bearing on its opposite face adjacent an end edge a line of adhesive extending transversely to the first mentioned lines and substantially across said face, and forming a bag of said blank by first removing the cover strips from one of said longer lines of adhesive and partially from the other, and folding the blank so as to form an axial lapped seam and an end closure seam therein, maintaining the folded condition by the pressure sensitivity of said adhesive, one portion of said longer line of adhesive extending across the lapped portion of said fabric in said axial seam to the extent of reaching and merging with the shorter line of adhesive, and thereafter subjecting said axial seam to heat and pressure to form a firm thermoplastic bond.

2. The process claimed in claim 1, wherein the pressure is substantially confined to the areas of seam formation.

3. A process of producing waterproof bags which comprises moving a supply of waterproof material longitudinally, and during such movement imposing upon at least one lateral edge portion of the material a stripe of a waterproof, thermoplastic adhesive of high cohesiveness and pressure sensitive at normal temperatures, said stripe being applied in heat softened condition, covering said stripe with a strip of removable material to prevent adhesion, severing the material into sheets, moving the sheets and imposing on said sheets a stripe of adhesive in a direction transverse the first mentioned stripe, folding said sheets so as to bring the severed edges thereof into lapping relationship in an area including said last mentioned stripe for forming a longitudinal lapped seam, accompanied by partial removal of said strip, employing the pressure sensitive characteristics of the adhesive to maintain the folded condition of said sheets, further moving said folded sheets and subjecting the longitudinal seam therein to pressure.

4. A process of producing waterproof bags which comprises moving a supply of waterproof material longitudinally, and during such movement imposing upon lateral edge portions of the material stripes of a waterproof, thermoplastic adhesive of high cohesiveness and pressure sensitive at normal temperatures, covering said stripes with strips of removable material to prevent adhesion, severing the material into sheets, moving the sheets and imposing on said sheets a stripe of similar adhesive in a direction transverse the first mentioned stripes, folding said sheets so as to bring the severed edges thereof into lapping relationship in an area including said last mentioned stripe for forming a longitudinal lapped seam, accompanied by partial removal of one of said strips and complete removal of the other, employing the pressure sensitive characteristics of the adhesive to maintain the folded condition of said sheets, further moving said folded sheets and subjecting the longitudinal and an end seam therein to pressure.

5. A process of producing waterproof bags which comprises moving a supply of waterproof material longitudinally, and during such movement imposing upon lateral edge portions of the material stripes of a waterproof, thermoplastic adhesive of high cohesiveness and pressure sensitive at normal temperatures, covering said stripes with strips of removable material to prevent adhesion, severing the material into sheets, moving the sheets and imposing on said sheets a stripe of similar adhesive in a direction transverse the first mentioned stripes, folding said sheets so as to bring the severed edges thereof into lapping relationship in an area including said last mentioned stripe for forming a longitudinal lapped seam, accompanied by partial removal of sone of said strips and complete removal of the other, employing the pressure sensitive characteristics of the adhesive to maintain the folded condition of said sheets, further moving said folded sheets and subjecting the longitudinal and an end seam therein to pressure, while subjecting the said longitudinal seam at least to heat.

6. The process claimed in claim 5 wherein the said waterproof material is a plural-ply fabric comprising universally stretchable creped paper layers adhered together by a waterproof adhesive.

7. The process claimed in claim 5 wherein the said waterproof material is a plural-ply fabric comprising universally stretchable creped paper layers adhered together by a waterproof adhesive, the waterproof adhesive in all instances comprising a bitumen.

8. The process claimed in claim 5 wherein the said waterproof material is a plural-ply fabric comprising universally stretchable creped paper layers adhered together by a waterproof adhesive, the waterproof adhesive in all instances comprising a bitumen, and said strips of removable material being non-fibrous film, capable of being broken away from said bitumen by a quick jerking movement.

9. In a process of making bags or coverings, the steps of striping a web of fabric with a thermoplastic adhesive which is pressure sensitive at normal temperatures, said adhesive being applied in a heat softened condition, covering the stripe so formed with a removable covering strip, cutting the fabric apart into sheets, the presence of the said covering strip permitting the handling of said sheets as in stacking them, and removing the said covering strip during the manufacture of open bags or coverings from said sheets, whereby to make said adhesive available for seam formation, and in which the web and hence the sheets are provided with a second stripe of similar adhesive similarly covered with a covering strip, to form a final closure, and in which the process of making the open bags or coverings includes the step of partial removal of said last mentioned strip to permit continuity of adhesive union in a seam other than the final closure seam, while the remainder of said strip remains on the said second stripe to prevent premature closure.

10. A process of producing water proof bags which comprises moving a supply of water-proof material longitudinally, and during such movement imposing upon lateral edge portions of the material stripes of a water-proof, thermoplastic adhesive of high cohesiveness and pressure sensitivity at normal temperatures, covered with strips of removable material to prevent adhesion, severing the material into sheets, moving the sheets and imposing on said sheets a stripe of similar adhesive in a direction transverse the first mentioned stripes, folding said sheets so as to bring the severed edges thereof into lapping relationship in an area including said last mentioned stripe for forming a longitudinal lapped seam, accompanied by partial removal of one of said strips and complete removal of the other, employing the pressure sensitive characteristics of the adhesive to maintain the folded condition of said sheets, further moving said folded sheets and subjecting the longitudinal and an end seam therein to pressure.

WILLIAM WALLACE ROWE.

REFERENCES CITED

The following references are of record in the file of this patent:

UNITED STATES PATENTS

| Number | Name | Date |
| --- | --- | --- |
| 537,566 | Dale | Apr. 16, 1895 |
| 793,034 | Kitsee | June 20, 1905 |
| 1,137,281 | Peterson | Apr. 27, 1915 |
| 1,358,834 | Farrell | Nov. 16, 1920 |
| 1,800,143 | Hughes | Apr. 7, 1931 |
| 1,983,291 | Haskell | Dec. 4, 1934 |
| 2,014,460 | Alm | Sept. 17, 1935 |
| 2,023,784 | Farren et al. | Dec. 10, 1935 |
| 2,071,362 | Rowe | Feb. 23, 1937 |
| 2,098,258 | Rowe | Nov. 9, 1937 |
| 2,142,194 | Karfoil | Jan. 3, 1939 |
| 2,152,323 | Moore | Mar. 28, 1939 |
| 2,171,718 | Vogt | Sept. 5, 1939 |
| 2,176,370 | Wagner | Oct. 17, 1939 |
| 2,237,327 | Bell | Apr. 8, 1941 |
| 2,245,675 | Hultin | June 17, 1941 |
| 2,259,996 | Gurwick | Oct. 21, 1941 |
| 2,262,111 | Moore | Nov. 11, 1941 |
| 2,292,024 | Dreher | Aug. 4, 1942 |
| 2,307,890 | Lakso | Jan. 12, 1943 |